United States Patent
Gaal et al.

(10) Patent No.: US 8,223,908 B2
(45) Date of Patent: Jul. 17, 2012

(54) SELECTION OF ACQUISITION SEQUENCES FOR OPTIMAL FREQUENCY OFFSET ESTIMATION

(75) Inventors: Peter Gaal, San Diego, CA (US); Byoung-Hoon Kim, Seoul (KR); Ke Liu, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 959 days.

(21) Appl. No.: 12/113,409

(22) Filed: May 1, 2008

(65) Prior Publication Data

US 2008/0273582 A1 Nov. 6, 2008

Related U.S. Application Data

(60) Provisional application No. 60/915,434, filed on May 2, 2007.

(51) Int. Cl.
 H04L 7/00 (2006.01)
(52) U.S. Cl. .......................... 375/354; 375/344; 375/362
(58) Field of Classification Search .................. 375/344, 375/354, 355, 362, 371
 See application file for complete search history.

(56) References Cited

U.S. PATENT DOCUMENTS

| | | | |
|---|---|---|---|
| 6,470,030 B1 | 10/2002 | Park et al. | |
| 2005/0286402 A1 | 12/2005 | Byun et al. | |
| 2009/0202029 A1* | 8/2009 | Nazar et al. | 375/362 |

FOREIGN PATENT DOCUMENTS

| | | |
|---|---|---|
| JP | 2010506531 A | 2/2010 |
| JP | 2010516076 A | 5/2010 |
| JP | 2010517452 A | 5/2010 |
| JP | 2010518724 A | 5/2010 |
| JP | 2010519867 A | 6/2010 |
| JP | 2010526472 A | 7/2010 |
| JP | 2011502365 A | 1/2011 |
| RU | 2276643 | 5/2006 |
| WO | WO2005004428 A1 | 1/2005 |
| WO | WO2006105307 A1 | 10/2006 |
| WO | WO2008075881 A2 | 6/2008 |
| WO | WO2008082262 A2 | 7/2008 |
| WO | WO2008133486 A1 | 11/2008 |

OTHER PUBLICATIONS

International Search Report and Written Opinion—PCT/US2008/062554, International Search Authority—European Patent Office—Jun. 8, 2008.

LG Electronics: "Time Domain PSC design using Zadoff-Chu sequence", 3 GPP TSG RAN WGI #48 BIS, [Online], Mar. 26. 2007-Mar. 30, 2007, pp. 1-13, XP002488769, St Julians, Malta, Retrieved from the Internet: http://www.3gpp.org/ftp/tsg ranAVGI RLI/TSGRI 48b/Docs/R1-071530.zip [retrieved on Oct. 21, 2010].

* cited by examiner

*Primary Examiner* — David B. Lugo
(74) *Attorney, Agent, or Firm* — Larry Moskowitz

(57) ABSTRACT

Systems and methods are provided to generate a set of synchronization channel sequences that optimize time and frequency acquisition. A set of root indices of Zadoff-Chu sequences in a first domain (e.g., time domain) that optimize a performance metric or merit factor are identified. An optimal index is determined that also optimizes a performance metric in a reciprocal domain (e.g., frequency domain). Optimal indices satisfy a centro-symmetric relationship with respect to a half-value of sequence length: When 1 is an optimal index, N−1 is also an optimal root index. For sequences of length $Q^2=N$, a base sequence generated with an optimal sequence can be utilized to generate at least two disparate optimal sequences through sign-flip, conjugation, and periodic modulation operations.

18 Claims, 11 Drawing Sheets

SELECTION OF ACQUISITION SEQUENCES FOR OPTIMAL FREQUENCY OFFSET ESTIMATION

CLAIM OF PRIORITY UNDER 35 U.S.C. §119

This Application for Patent claims the benefit of U.S. Provisional Application Ser. No. 60/915,434 filed on May 2, 2007, and entitled "CHU SEQUENCE FREQUENCY TRACKING IN COMMUNICATIONS." The entirety of this application is expressly incorporated herein by reference.

BACKGROUND

1. Field

The subject disclosure relates generally to wireless communication and, more particularly, to synchronization channel design for optimal frequency offset estimation.

2. Background

Wireless communication systems are widely deployed to provide various types of communication content such as voice, video, data, and so on. These systems may be multiple-access systems capable of supporting simultaneous communication of multiple terminals with one or more base stations. Multiple-access communication relies on sharing available system resources (e.g., bandwidth and transmit power). Examples of multiple-access systems include code division multiple access (CDMA) systems, time division multiple access (TDMA) systems, frequency division multiple access (FDMA) systems, and orthogonal frequency division multiple access (OFDMA) systems.

Communication between a terminal in a wireless system (e.g., a multiple-access system) and a base station is effected through transmissions over a wireless link comprised of a forward link and a reverse link. Such communication link may be established via a single-input-single-output (SISO), multiple-input-single-output (MISO), or a multiple-input-multiple-output (MIMO) system. A MIMO system consists of transmitter(s) and receivers) equipped, respectively, with multiple ($N_T$) transmit antennas and multiple ($N_R$) receive antennas for data transmission. SISO and MISO systems are particular instances of a MIMO system. A MIMO channel formed by $N_T$ transmit and $N_R$ receive antennas may be decomposed into $N_v$ independent channels, which are also referred to as spatial channels, where $N_v \leq \min\{N_T, N_R\}$. Each of the $N_v$ independent channels corresponds to a dimension. The MIMO system can provide improved performance (e.g., higher throughput, greater capacity, or improved reliability) if the additional dimensionalities created by the multiple transmit and receive antennas are utilized.

Regardless the peculiarities of the many available wireless communication systems, in each of these systems a wireless device must perform cell acquisition in order to become operational upon switching on, and tracking to retain communication(s). Cell acquisition is the procedure by which a terminal acquires time and frequency synchronization with the network, cell identification, and additional identification of system information critical to operation, such as system bandwidth and antenna configuration of cell transmitter. It should be appreciated that subsequent to cell acquisition, a mobile terminal can continue to synchronize time and frequency for tracking purposes; e.g., to correct frequency shifts caused by various sources, such as Doppler effect. In sectorized wireless environments, acquisition is to be conducted for each sector present in a cell.

Cell or sector acquisition relies on pilot signals, or acquisition sequences, conveyed through a set of synchronization physical channels and a broadcast channel. Upon transmission of synchronization channels from a cell's or sector's base station, a receiver correlates the acquisition signal with a set of local sequences hypotheses in order to determine time and frequency offsets for receiving downlink traffic. Likewise, a base station can correlate acquisition signals received from a mobile in order to successfully decode control uplink signals. Depending on the utilized acquisition sequences, substantial sensitivity to systematic errors in offset estimation of frequency or time can result in poor downlink or uplink communication. Therefore, there is a need in the art for synchronization channel design that is robust with respect to systematic errors of time offsets and provides optimal frequency offset estimation.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The subject innovation provides system(s) and method(s) are provided to generate a set of synchronization channel sequences that optimize time and frequency acquisition. A set of root indices of polyphase Zadoff-Chu sequences in a first domain (e.g., time domain) that optimize a performance metric or merit factor are identified. Identification is performed through simulation. An optimal index is determined that also optimizes a performance metric in a reciprocal domain (e.g., frequency domain). Optimal indices satisfy a centro-symmetric relationship with respect to a half-value of sequence length: When $\lambda$ is an optimal index, $N-\lambda$ is also an optimal root index. For sequences of length $Q^2=N$, a base sequence generated with an optimal sequence can be utilized to generate at least two disparate optimal sequences: One sequence generated through sign-flip and conjugation operations on an optimal base sequence, and a second sequence that arises from a Q-periodic modulation operation.

In an aspect, the innovation describes a method for designing a synchronization channel, the method comprising: identifying an optimal root index in a first domain according to a first performance criterion; determining a domain-dual root index for the optimal root index in the first domain and computing a performance metric for the domain-dual root index; and when the domain-dual root index satisfies a second performance criterion, storing the optimal root index.

In another aspect, an apparatus that operates in a wireless communication system is disclosed, the apparatus comprising: a processor configured to compute a performance metric for a set of time-domain root indices; to select an optimal time-domain root index according to a first performance criterion; to determine a frequency-domain root index for the time-domain optimal root index; to compute a performance metric for the frequency-domain root index; and a memory coupled to the processor.

In yet another aspect, the innovation describes a wireless communication device, wherein the device comprises: means for computing a performance metric for a set of time-domain root indices; means for identifying an optimal time-domain root index according to a first performance criterion; means for determining a frequency-domain root index for the time-domain optimal root index; means for computing a performance metric for the frequency-domain root index; and means for generating a Zadoff-Chu sequence of length N (a positive integer) with an optimal root index in a first domain.

In a further yet aspect; a computer program product is disclosed, the computer program product including a computer-readable medium comprising: code for causing a computer to compute a performance metric for a set of time-domain root indices; code for causing the computer to select an optimal time-domain root index according to a first performance criterion; code for causing the computer to determine a frequency-domain root index for the time-domain optimal root index; code for causing the computer to calculate a performance metric for the frequency-domain root index; and code for causing the computer to generate a Zadoff-Chu sequence of length N (a positive integer) with an optimal root index in a first domain.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
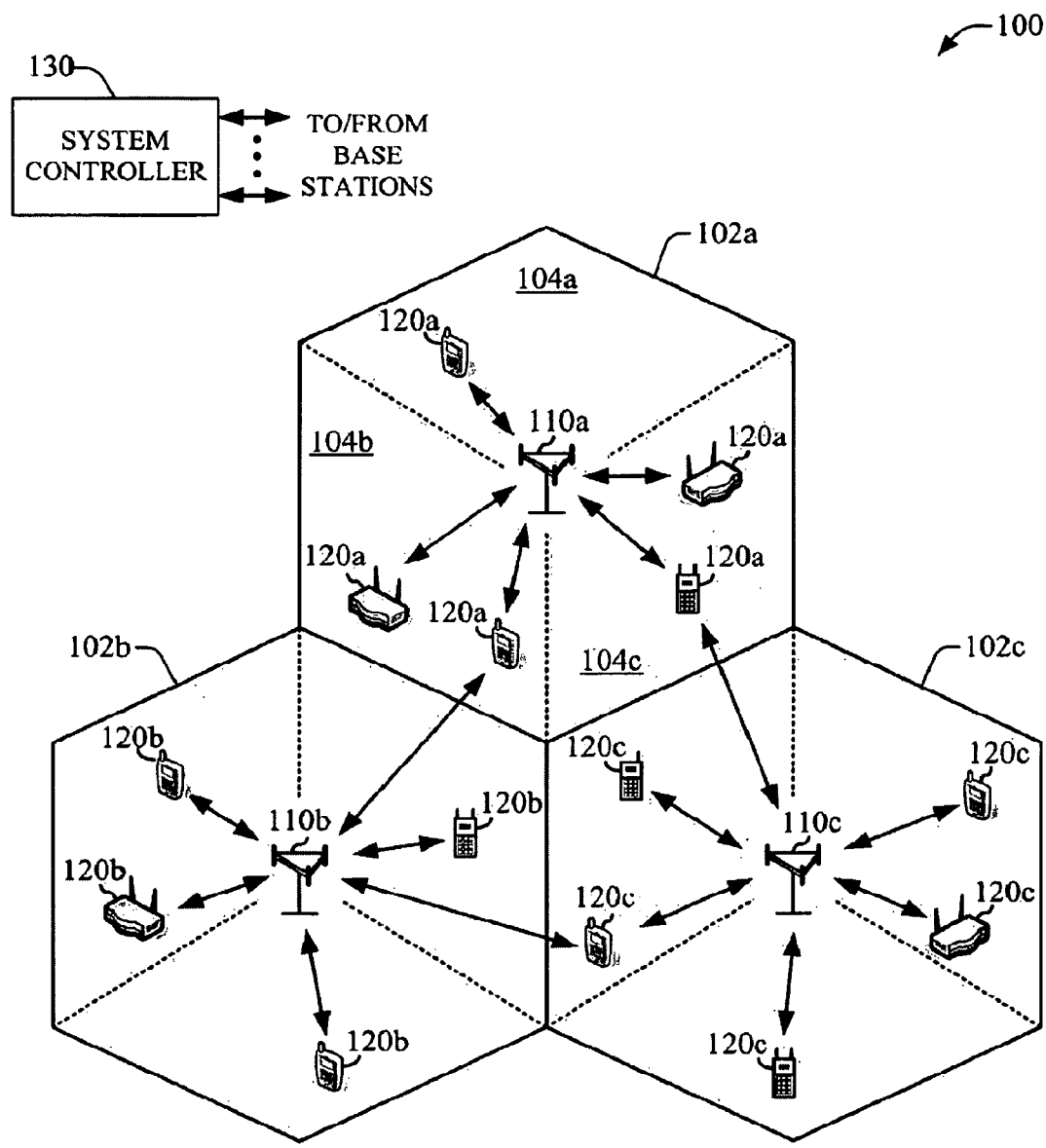
FIG. 1 illustrates an example wireless multiple-access communication system, in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "system," "component," "module," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms "code" and "symbol sequence," or the simpler term "sequence," are intended to convey the same notion and are employed interchangeably. It is to be noted that in the subject specification the term "code" is also utilized to indicate "computer programming code." The context of the passages of this description wherein "code" is employed conveys to one of ordinary skill in the art the intended meaning for the subject term; in instances where the context may not be sufficiently clear an explicit reference to the meaning of the term "code" is provided.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, customer premises equipment, or user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals, and with other base stations through backhaul network communication. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point (AP), Node B, evolved Node B (eNodeB), evolved base station (eBS), access network (AN) or some other terminology.

Referring now to the drawings, FIG. 1 is an illustration of a wireless multiple-access communication system 100 in accordance with various aspects disclosed in the subject specification. In one example, the wireless multiple-access communication system 100 includes multiple base stations 110a-110c and multiple terminals 120a-120c. Further, one or more base stations 110a-110c, can communicate with one or more terminals 120. By way of non-limiting example, a base station (e.g., base station 110a) can be an access point, a Node B, and/or another appropriate network entity. Each base station 110 provides communication coverage for a particular geographic area 102a-c. As used herein and generally in the art, the term "cell" can refer to a base station (e.g., 110a) and/or its coverage area (e.g., 102a) depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a-104c can be served by a respective base transceiver subsystem (BTS, not shown). As used herein and generally in the art, the term "sector" can refer to a BTS and/or its coverage area depending on the context in which the term is used. As an example, sectors 104a, 104b, 104c in cell 102a (or cells 102b and 102c) can be formed by groups of antennas (not shown) at a base associated with such sector (e.g., base station 110a), where each group of antennas is responsible for communication with terminals 120a-c in a portion of cell 102a, 102b, or 102c. Such utilization of a specific group of antennas is known as beamforming, wherein multiple antennas are employed to transmit a signal in a directed, localized pattern. For example, base station 110 serving cell 102a can have a first antenna group corresponding to sector 104a, a second antenna group corresponding to sector 104b, and a third antenna group corresponding to sector 104c. In an aspect, each sector 104a, 104b, and 104c in sectorized cell 102a (or cells 102b and 102c) can have a sector identifier. Such an identifier can be acquired during cell search. It should be appreciated that various aspects of the innovation described herein can be used in a system having sectorized or unsectorized cells since cell acquisition occurs among a base station and one or more terminals 120a-c irrespective of sectorization. Furthermore, all suitable wireless communication networks having substantially any number of sectorized or unsectorized cells are intended to fall within the scope of the hereto appended claims.

For simplicity, the term "base station" (or other terminology that indicates "base station") as employed herein can refer both to a station that serves a sector as well as a station that serves a cell. While the following description generally relates to a system in which each terminal communicates with one serving access point for simplicity, it should be appreciated that terminals can communicate with any number of serving base stations.

In accordance with one aspect, terminals 120a-c can be dispersed throughout the system 100. Each terminal 120a-c can be stationary or mobile. By way of non-limiting example, a terminal can be an access terminal (AT), a mobile station, user equipment, a subscriber station, a wireless device, a cellular phone, a personal digital assistant (PDA), a wireless modem, a handheld device, or another appropriate device that communicates wirelessly.

As an example, the system 100 can utilize a centralized architecture by employing a system controller 130 that can be coupled to one or more base stations 110a-c and provide coordination and control for the base stations 110a-c. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120a-c are orthogonalized by transmitting in different frequency subcarriers. For instance, TDMA and FDMA systems can also use code division multiplexing (CDM), wherein transmissions for multiple terminals can be orthogonalized using different orthogonal codes (e.g., Walsh codes, Gold codes, Kasami codes, Zadoff-Chu sequences) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA.

While the power control techniques provided herein are generally described for an OFDMA system, it should be appreciated that the techniques described herein can similarly be applied to any wireless communication system.

In another example, base stations 110a-c and terminals 120a-c in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections (e.g., systematic errors in time offsets) than corresponding control channels.

In accordance with an aspect, system 100 can employ centralized scheduling via one or more schedulers implemented at, for example, system controller 130 and/or each base station 110. In a system utilizing centralized scheduling, schedulers) can rely on feedback from terminals 120 to make appropriate scheduling decisions. As an example, such feedback can include an offset added to receive other sector interference information in order to allow the scheduler to estimate a supportable reverse link peak rate for a terminal 120a-c, from which such feedback is received, and to allocate system bandwidth accordingly.

Figure 2:
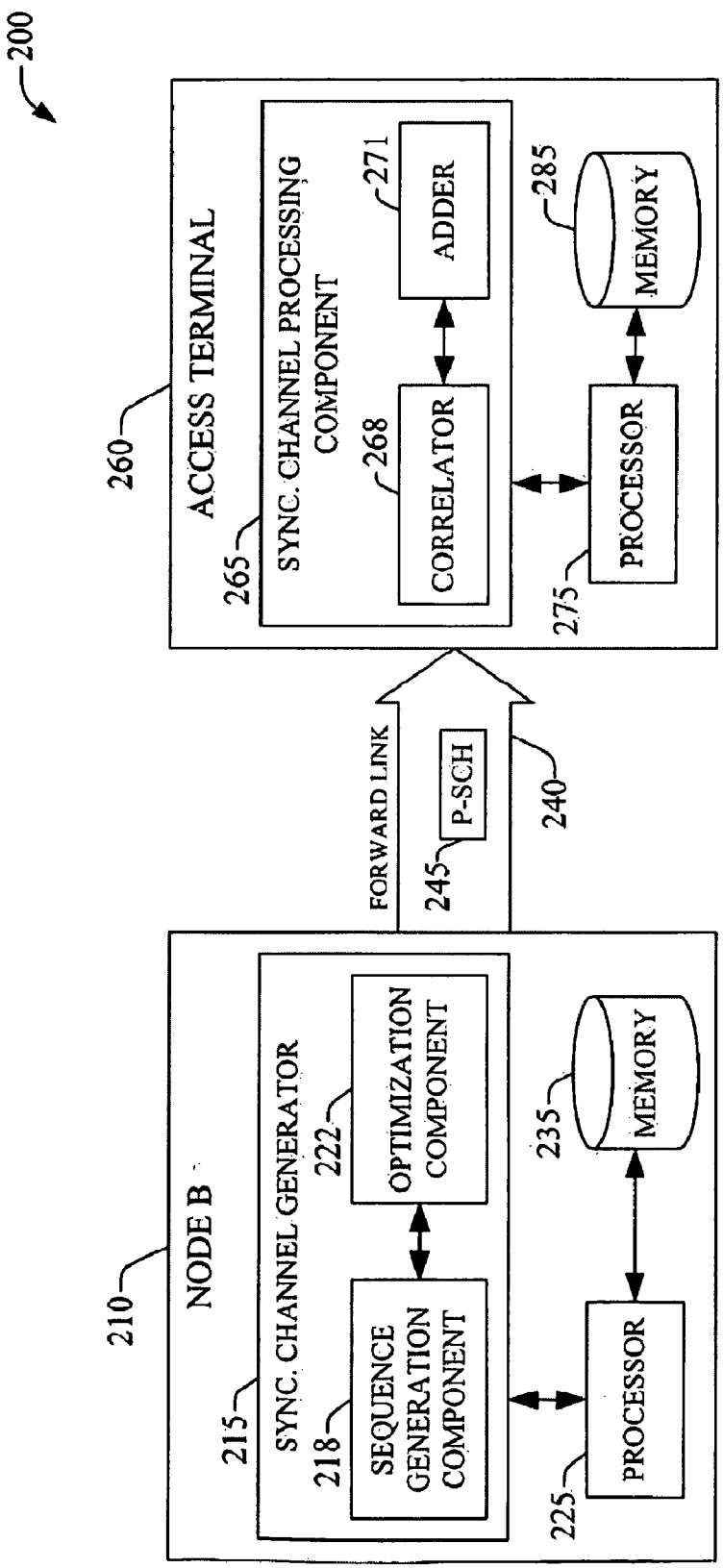
FIG. 2 is a block diagram of an example system that generates, communicates, and processes a set of synchronization sequences according to aspects described in the subject specification.

FIG. 2 is a block diagram of a system 200 that generates, optimizes, communicates, and processes a set of synchronization channel sequences which facilitate time and frequency synchronization as well as determination of operational parameters of a wireless system (e.g., cell identity, symbol timing). Node B 210 can generate a set of synchronization channel sequences, or acquisition pilots, through synchronization channel generator 215. Such synchronization sequences, e.g., a primary synchronization channel (P-SCH) 245 can be employed for cell/sector time and frequency synchronization and is transmitted over a forward link (FL) 240 of a wireless system to an access terminal 260 that processes the PSC sequence via a synchronization channel processing component 265. It should be appreciated that a synchronization channel can also comprise a secondary synchronization channel (S-SCH). Once the access terminal 260 decodes the acquisition pilots, which can comprise both P-SCH 245 and S-SCH (not shown), operational parameters of the wireless system become available; namely, (i) system bandwidth, characterized by a FFT size in the case of a FDMA system; (ii) perforation profile in the case of perforated spectrum allocation; (iii) indication of time division duplex (TDD) or frequency division duplex (FDD), with further indication of specific TDD partitioning and FDD half duplex (the latter further carries an indication of time guard intervals as well as frequency-domain guard interval for forward link and reverse link); (iv) cyclic prefix length; (v) indication of synchronous or asynchronous operation; (vi) frequency reuse; (vii) cell/sector identification index, or cell/sector identifier; and (viii) antenna configuration at base station (e.g., Node B 210), and so on. In addition, it should be appreciated that a received synchronization sequence can be employed as a phase reference for coherent detection of a received data channel.

In accordance with an aspect of synchronization channel generator 215, a sequence generation component 218 can generate a length-N (with N a positive integer) sequence of bits or complex symbols that can contain at least a portion of the cell/sector search information (i)-(viii). Sequences can be pseudorandom codes or pseudonoise sequences, a Gold sequence, a Walsh-Hadamard sequence, an exponential sequence, a Golomb sequence, a Rice sequence, an M-sequence, a Kasami sequence, or a polyphase sequence such as a generalized chirp-like (GCL) sequence (e.g., Zadoff-Chu sequence). It is to be noted that polyphase sequences of length N are defined through the N-order roots of unity in the complex plane, and a family of N sequences, each determined in part by a root index $\lambda=0, 2, \ldots N-1$.

Sequence generation component 218 typically generates a pilot sequence according to the specification of the wireless system in which communication takes place. As a non-limiting example, in E-UTRA (evolved universal terrestrial radio access) the P-SCH signal corresponds to a sequential concatenation of two length-31 frequency-domain Zhadoff-Chu sequences specified by one of three physical-layer identity indicators, and S-SCH is an interleaved concatenation of two 31-bit sequences that is scrambled prior to modulation. In addition, primary synchronization code (PSC) conveyed in P-SCH 245 can be linked to a sector or cell identifier, which can be reusable throughout multiple cells in the wireless system. For example, in E-UTRA a root index $\lambda$ that determines each of the Zhadoff-Chu sequences that comprise a PSC depends on the physical-layer index. As described herein, optimal $\lambda$s are determined such that frequency offset estimation noise or error is mitigated.

In example system 200, an optimization component 222 can select acquisition sequences that satisfy specific constraints associated with a predefined performance metric. For example, such a metric can be an error in frequency offset estimation for a specified uncertainty in time offset estimation. To select optimal sequences from a set of sequences, e.g., a family of N polyphase sequences of length N, optimization component can perform various operations and computations assisted by processor 225, which is configured to perform at least a portion of such operations and computations. For example, operations performed by optimization component can include maximum likelihood searches, regression, spectral analysis such as Fourier transformation, Gabor transformation, Hadamard transformations and their respective inverses, and so on. Data structures, instructions, and outcomes of operations performed by processor 225 in connection with optimization conducted by optimization component 222, can be stored in memory 235.

In addition to the computations and operations mentioned hereinbefore, sequence generation component 215 can employ processor 225 to perform a portion of sequence generation and association, such as pseudorandom number generation, matrix manipulation involved in construction Walsh-Hadamard sequences, generation of GCL sequences, determination of cell/sector identifiers, generation of a concatenation indication, as well as initializing registers and storing generated sequences and updated counter values in a memory 225. Furthermore, processor 225 can perform data manipulation necessary to communicate a sequence, as well as control and data channels. In an aspect, in an FDMA wireless system, processor 225 can perform direct/inverse Fourier transformations (D/IFT)—necessary for mapping a sequence into a frequency-time resource block prior to communication—Hadamard transformation, addition of cyclic prefixes to a sequence, modulation of control and data streams, as well as serial-to-parallel/parallel-to-serial manipulations. In a CDMA wireless system (e.g., ultra-mobile broadband), scrambling of symbols in a control sequence or traffic sequence can be executed by processor 222. It should be appreciated that processor 222 can perform other actions related to communication of node B 210 with access terminal 260, such additional actions would be readily apparent to one of ordinary skill.

Memory 225 can store code instructions/modules employed to generate sequences and association of sequences with cell/sector identification indices, as well as code instructions for operations necessary to manipulate and transmit such sequences, control and data over forward link 240.

In connection with access terminal 260, a synchronization channel processing component 265 detects and decodes (or demodulates) synchronization channel signals. In an aspect, bits or complex symbols, either scrambled or unscrambled, that have been transmitted in P-SCH 245 or S-SCH (not shown) by node B 210 through FL 240 upon generation of a sequence based upon an orthogonal code (e.g. Walsh-Hadamard, exponential, or the like) or non-orthogonal code, are decoded by correlating with each of the appropriate orthogonal or non-orthogonal sequences (e.g., code hypotheses). Detection of P-SCH (or demodulation of PSC) can lead to determination of timing information, such as time and frequency offsets, and slot duration or cyclic prefix. In addition, detection of PSC can result in determination of information linked with PSC like a cell/sector identifier as indicated above. It is to be noted that access terminal 260 accesses, e.g., via memory 285, a set of sequence hypotheses compatible with sequences generated by sequence generation component 218 to perform a correlation with received a received PSC in order to identify an adequate cell/sector index. It should be appreciated that efficient detection of PSC generally can be accomplished by employing a Hadamard transformation for Walsh-Hadamard sequences, and a fast Fourier transformation for exponential sequences.

As a part of synchronization channel acquisition, a component, correlator 268, correlates (in time domain or frequency domain) disparate sequences and utilizes adder 271 to coherently integrate portions of the correlated sequence to extract timing information (e.g., time offset, or superframe, frame and symbol boundary detection), frequency synchronization, and other system information such as cell/sector identifiers. Correlator 268 and adder 271 rely on processor 232 to perform temporal correlation, integration, as well as other operations such as inverse FFT (IFFT). Timing and frequency synchronization methods such as Moose method, Van De Beenk method, and Schmidl method, propose particular code sequences with repeated sections of the transmitted bit series or complex symbol series (e.g., PSC) to estimate frame and subframe boundaries, as well as frequency offset. Other methods also can be used for time correlation, superframe, frame, and symbol boundary detection; CP duration; and frequency synchronization.

Figure 3:
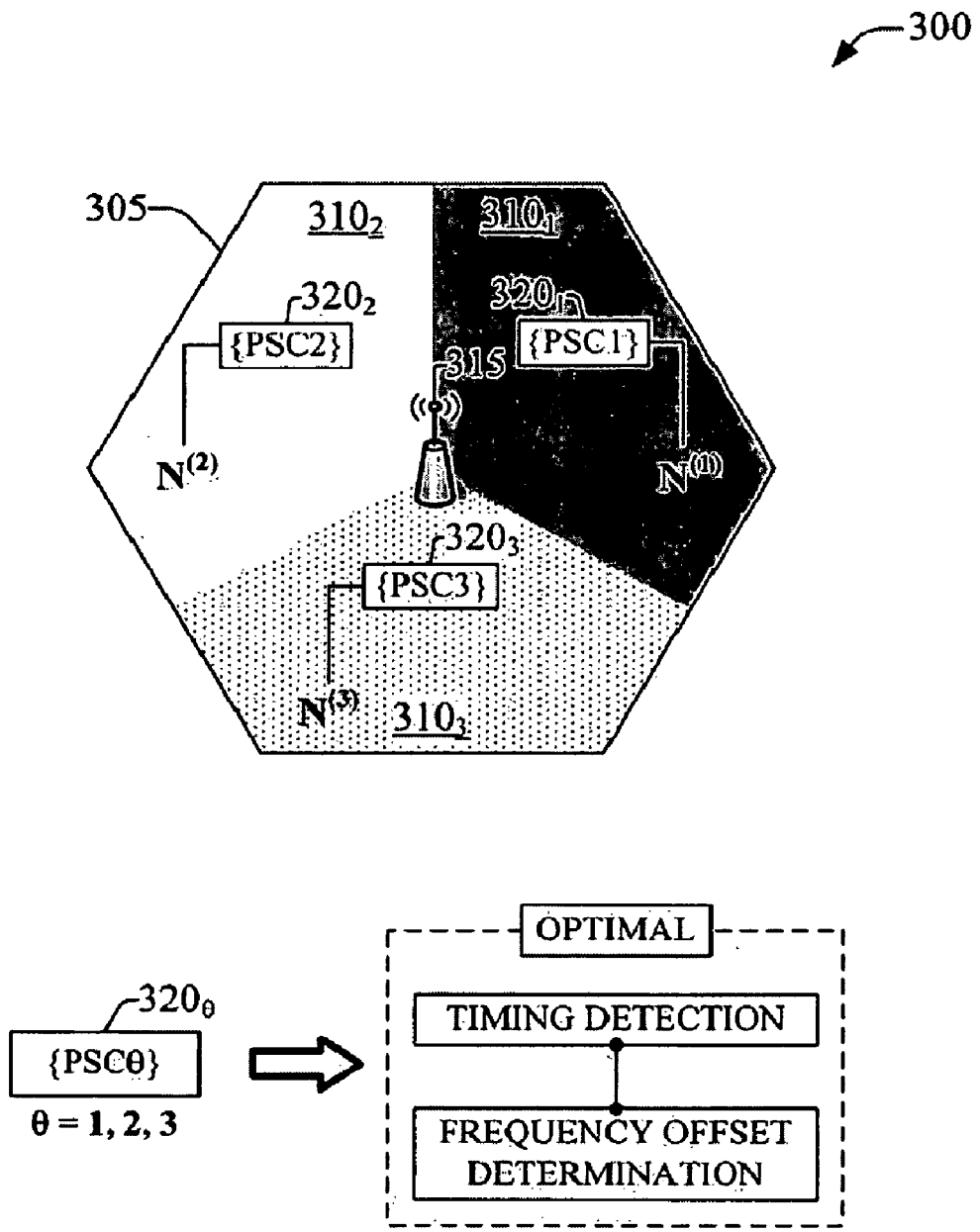
FIG. 3 is a diagram of an example mapping between a set of primary synchronization sequences and a set of sectors in wireless communication cell in accordance with: aspects described herein.

FIG. 3 is a diagram 300 of an example mapping between a set of primary synchronization sequences and a set of sectors in wireless communication cell. In diagram 300, cell 305 is sectorized in three sectors 310₁, 310₂, and 310₃, which are served by base station 315. Cell 305 is illustrated as hexagonal even though other geometries can be deployed; typically cell geometry is dictated by various factors such as the landscape of the coverage area, the operational characteristics (e.g., frequency planning) of the of a wireless communication system, and so on. In an aspect, each sector 310$_\lambda$ possesses a sector identifier $N^{(\theta)}$ ($\theta=1, 2, 3$) which can be reusable, e.g., each first sector in a cell can employ a common first identifier throughout each communication cell in a cellular wireless environment, each second sector in a cell can employ a common second identifier, and so on. Sector 310₁ has associated a {PSC1} 320₁, linked to identifier $N^{(1)}$; Sector 310₂ possesses a {PSC2} 320₂, linked to $N^{(2)}$; and sector 310₃ has a {PSC3} 320₃, linked to $N^{(3)}$. As mentioned above, each sector identifier $N^{(\theta)}$ can be associated to a root index $\lambda$ that defines a polyphase sequence {PSCθ}, such as a generalized Chirplike (GCL) sequence (e.g., Zadoff-Chu sequence). Therefore, as each primary sequence facilitates acquisition of its associated sector, an optimized root index $\lambda_{opt}$ can be utilized to define an optimal {PSC}$^{(opt)}$ for each sector. It is to be noted that generally cell 305 can be sectorized in M sectors (M≧1), and thus a corresponding set of M {PSC}$^{(opt)}$ sequences can be associated with each member of a set of sector identifiers $N^{(\theta)}$ ($\theta=1, 2, \ldots, M-1, M$). It is to be further noted that in E-UTRA, M=3 and thus three reusable {PSC}s are utilized in such communication technology. Further yet, as mentioned above, Zadoff-Chu sequences are employed in E-UTRA. Optimal root indices {$\lambda_{opt}$} can be selected, e.g., via optimization component 222, as described below.

Figure 4:
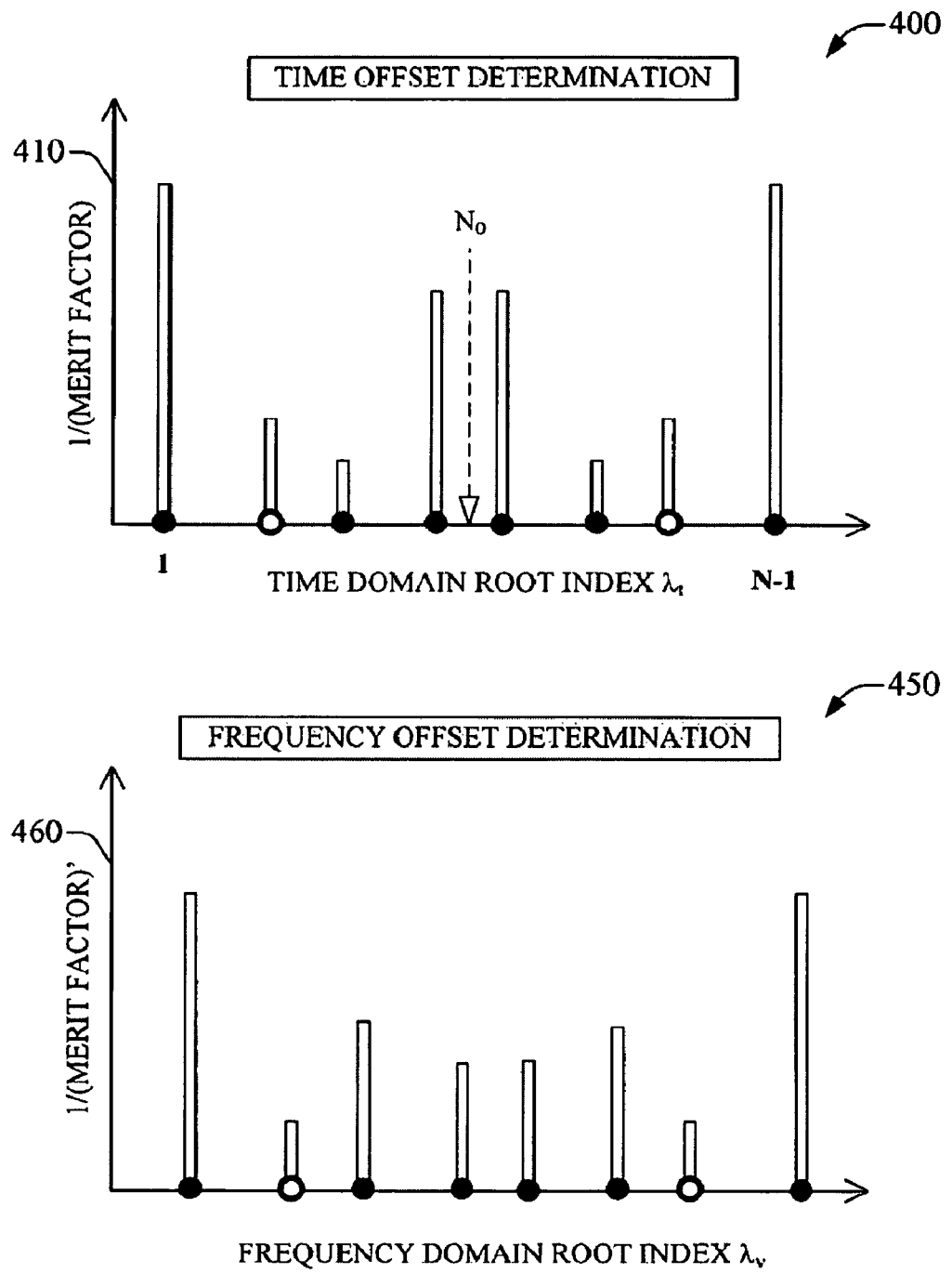
FIG. 4 displays a first and second diagrams that represent, respectively, a cross-correlation performance metric (e.g., 1/(merit factor) for a suitably defined merit factor) for time-domain primary synchronization sequences defined in part via a time-domain root index, and a performance metric for Fourier transformed primary synchronization sequences.

FIG. 4 displays diagrams 400 and 450 that represent, respectively, a cross-correlation performance metric 410 (e.g., 1/(merit factor) for a suitably defined merit factor) for time-domain primary synchronization sequences defined in part via a time-domain root index, and a performance metric 460 for Fourier transformed primary synchronization sequences. It should be appreciated that performance metrics 410 and 460 are typically disparate. For definiteness, primary synchronization sequence optimization is described for Zadoff-Chu sequences $S(\lambda,k)$. However, it is to be appreciated that substantially any sequence that belongs to the polyphase CAZAC (constant amplitude zero autocorrelation) category can be optimized similarly. Disparate root indices are indicated with solid circles, while optimal root indices are illustrated with open circles. It is to be noted that a time-domain Zadoff-Chu sequence $S(\lambda_1,l)$ when Fourier transformed remains a Zadoff-Chu sequence $S(\lambda_v,k)$ with a disparate root index $\lambda_v$. Thus, to finding an optimal root index demands optimizing the performance in time-domain and frequency-domain simultaneously. Generally, time and frequency synchronization performance are dictated by a cross-correlation of a received sequence and a reference hypothesis, performance is expected to be insensitive to a change of phase in each element in sequence utilized for synchronization. In view that a Zadoff-Chu sequence (e.g., in time domain) satisfies $$S(\lambda_i, k) = (-1)^k S\left(\lambda_i, \frac{N}{2}+k\right), k = 0,1,2, \ldots, \frac{N}{2}-1, \quad (1)$$

a performance metric is centro-symmetric with respect to N/2 for even length sequences or (N−1)/2 for odd length sequences. (N is a positive integer.) The latter symmetry of a Zadoff-Chu sequence indicates that if a root index $\lambda_{opt}$ is optimal, $\lambda'_{opt}=N-\lambda_{opt}$ is also optimal. Similarly, of an index displays a poor performance metric, so does its centro-symmetric transformation. Thus, once a PSC (e.g., PSC1 320₁) is optimized, a second PSC (e.g., PSC2 320₂) is simultaneously optimized.

In an aspect, a merit factor for a length-N Zadoff-Chu sequence can be defined as $$F = \sum_{k=-N/2}^{1} (kI_\lambda(k))^{-2} + \sum_{k=1}^{N/2-1} (kI_\lambda(k))^{-2}, \quad (2)$$

where $l_\lambda(k)=-\lambda k(\bmod N)-N/2$. Where $l_\lambda(k)$ is the locus of a discrete correlation peak in the reciprocal space of index k, namely, if l indicates an index in time domain, k indicates an index in frequency domain and vice versa. It is to be noted that F can also be utilized for other length-N polyphase sequences.

Figure 5:
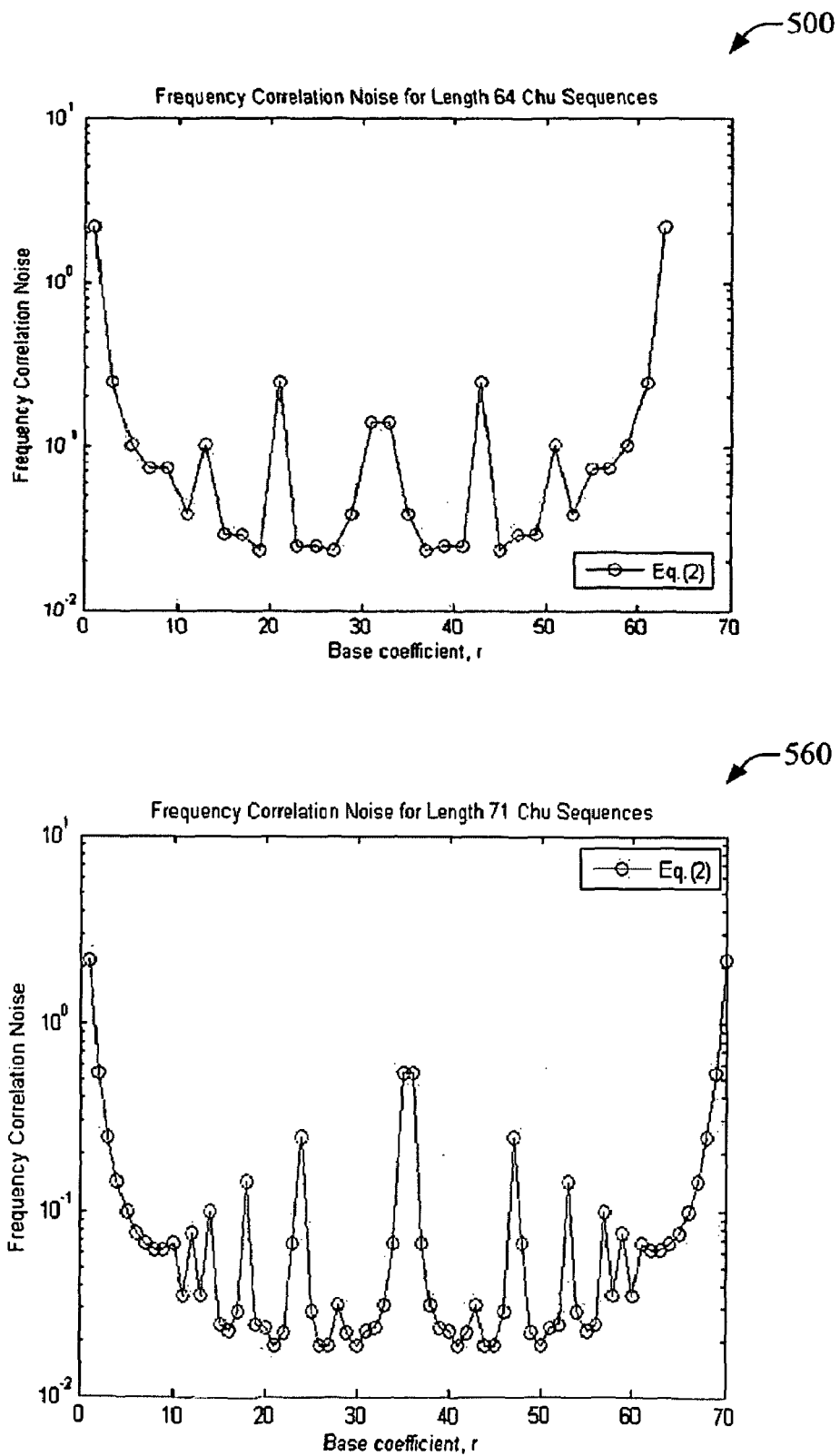
FIG. 5 illustrates a first and second diagrams that display an actual computation of a merit factor for Zadoff-Chu sequences of length N=64 and N=71, respectively, versus time-domain root index $\lambda$, wherein g.c.d.($\lambda$,N)=1.
Figure 6:
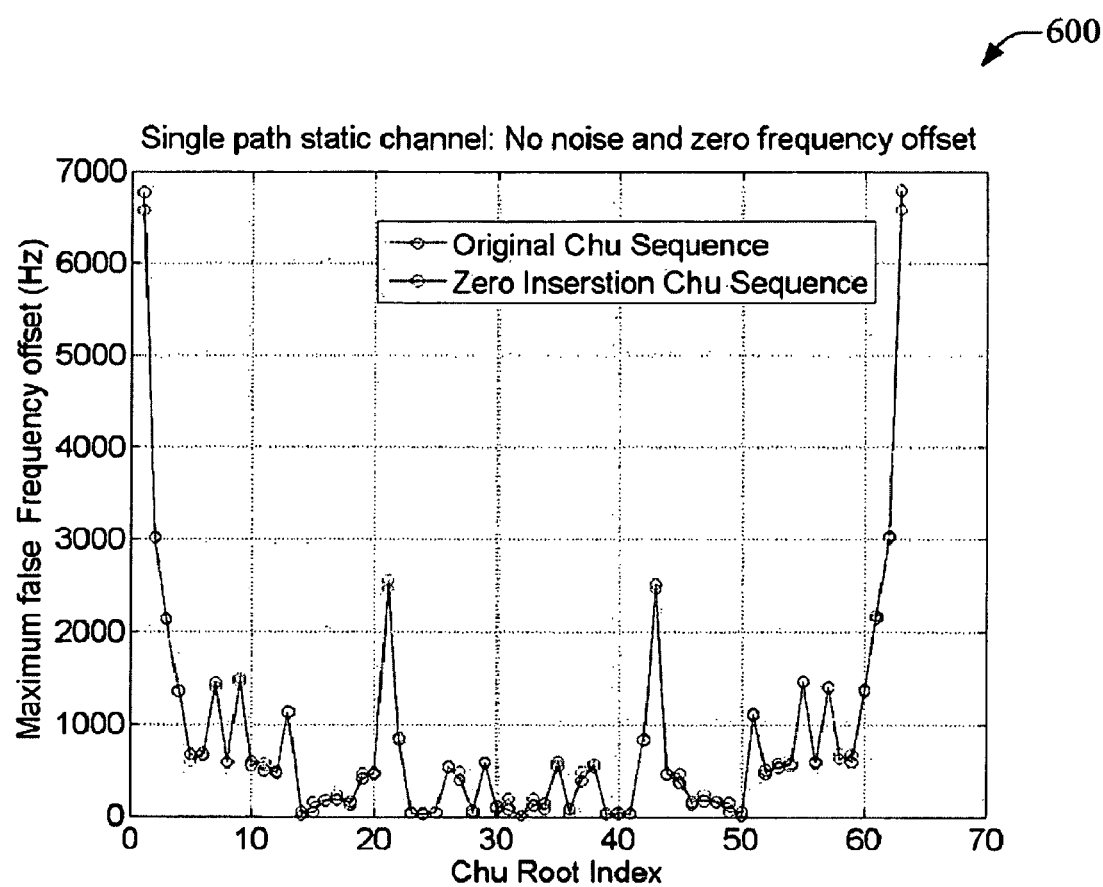
FIG. 6 illustrates a chart with simulation results of a performance metric that measures a magnitude of a "false" or apparent frequency offset for a time offset corresponding to a primary synchronization code chip for a sampling rate of 1.92 MHz.

FIG. 5 illustrates in diagrams 500 and 550 an actual computation of merit factor F [Eq. (2)] for Zadoff-Chu sequences of length N=64 and N=71, respectively, versus time-domain root index λ, wherein g.c.d.(λ,N)=1. It should be noted that F facilitates comparison among disparate root indices {λ} while it does not measure a frequency offset Δν. Variations in F can attain an order of magnitude when as a function of root index. Root index $\lambda_0=1$ and its centro-symmetric value $\lambda'_0=N-1$ are worst-case scenarios. An actual frequency error can be related to F through a Cramer-Rao bound rather than through a direct relationship. For a threshold value of 0.1 (in arbitrary units), a set of good, or optimal, root indices for N=64 is $\sigma_{64}^{(good)}=\{19,23,25,27,29,35,39,41,45\}$, whereas for N=71 a set of good root indices is $\sigma_{71}^{(good)}=\{21,25,26,30,41,45,46,50\}$. It should be appreciated that the sets of good values are sensitive to the selected threshold value;

FIG. 6 illustrates a chart 600 with simulation results of a performance metric that measures a magnitude of a "false" or apparent frequency offset for a time offset corresponding to a primary synchronization code chip for a sampling rate of 1.92 MHz. Simulations of frequency offsets assume a noiseless single path static channel with not actual frequency offset, and a sequence of length N=64 with and without zero insertion. To simulate an apparent frequency offset a differential offset estimator is assumed, such an estimator can be embodied in synchronization channel processing component 265. A differential estimator receives a signal (e.g., a primary synchronization code) and divides it is two segments which are correlated (e.g., through correlator 268) with a local sequence hypothesis. Each segment is integrated over successive lengths 1, 2, . . . , N/2, and a differential product of the two segments is computed and the phase Δϕ of the result is utilized to estimate a frequency offset Δν. It is to be noted that more than two segments can be for apparent frequency estimation.

For N=64, optimal time-domain root indices $\{\lambda_{opt}\}$ include {23, 25, 29, 31, 33, 35, 39, 41}. Such indices are centro-symmetric as expected. In an aspect, indices 31, 33, and 39 have, respectively, the following optimal frequency-domain indices: 33, 31, and 41. From simulation results, a subset of optimal indices is split by Δλ=8; for instance, $\lambda_{opt}=31$ and $\lambda'_{opt}=39$. This result of the simulation is consistent with the following relationship:

$$S(39, k) = e^{-i\frac{\pi}{8}k^2} S(31, k),$$

which reveals S(39,k) is a modulated replica of S(31,k). The modulating sequence corresponds to the 8th-root of unity:

$$\{1, e^{i\frac{\pi}{8}}, i, -e^{i\frac{\pi}{8}}, 1, -e^{i\frac{\pi}{8}}, i, e^{i\frac{\pi}{8}}\}.$$

The latter modulation corresponds to the 8-PSK constellation. Furthermore, for sequences of length $N=64=8^2$, the general result is that a root index $\lambda=\lambda_{opt}+8$ is an optimal root index. Further yet, for a sequence or length $M^2$ (M a positive integer), a root index $\lambda=\lambda_{opt}+M$ is a optimal index.

Figure 7:
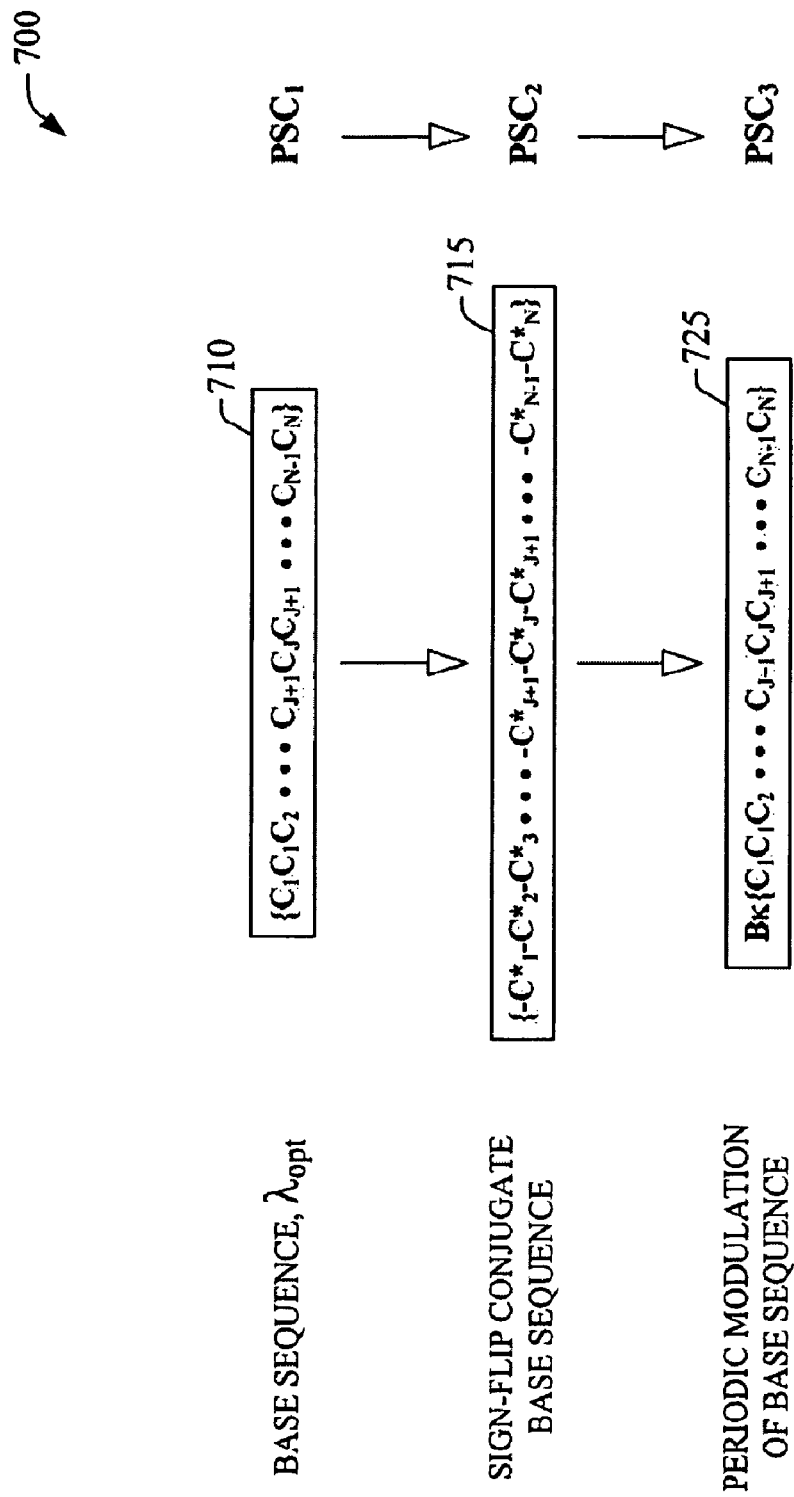
FIG. 7 illustrates schematically a construction of three optimal sequences that reduce apparent frequency offset $\Delta v$ in accordance with aspects described in the subject specification.

FIG. 7 illustrates schematically a construction of three optimal sequences that reduce apparent frequency offset Δν. A base sequence $S(\lambda_{opt},k)$ 710 with root index $\lambda_{opt}$ can be associated with a first primary synchronization code PSC1, and utilized to generate a second PSC2 715 via a conjugation and sign-flip operation of the base sequence. Such result arises from the relationship $S(N-\lambda,k)=(-1)^\lambda S'(\lambda,k)$, which is an alternative expression for the centro-symmetric property discussed above: A third primary synchronization code PSC3 725 can be generated from the base sequence PSC1 710 through a modulation of the base sequence with a periodic sequence $B_\kappa$ of period $\sqrt{N}$.

Figure 8:
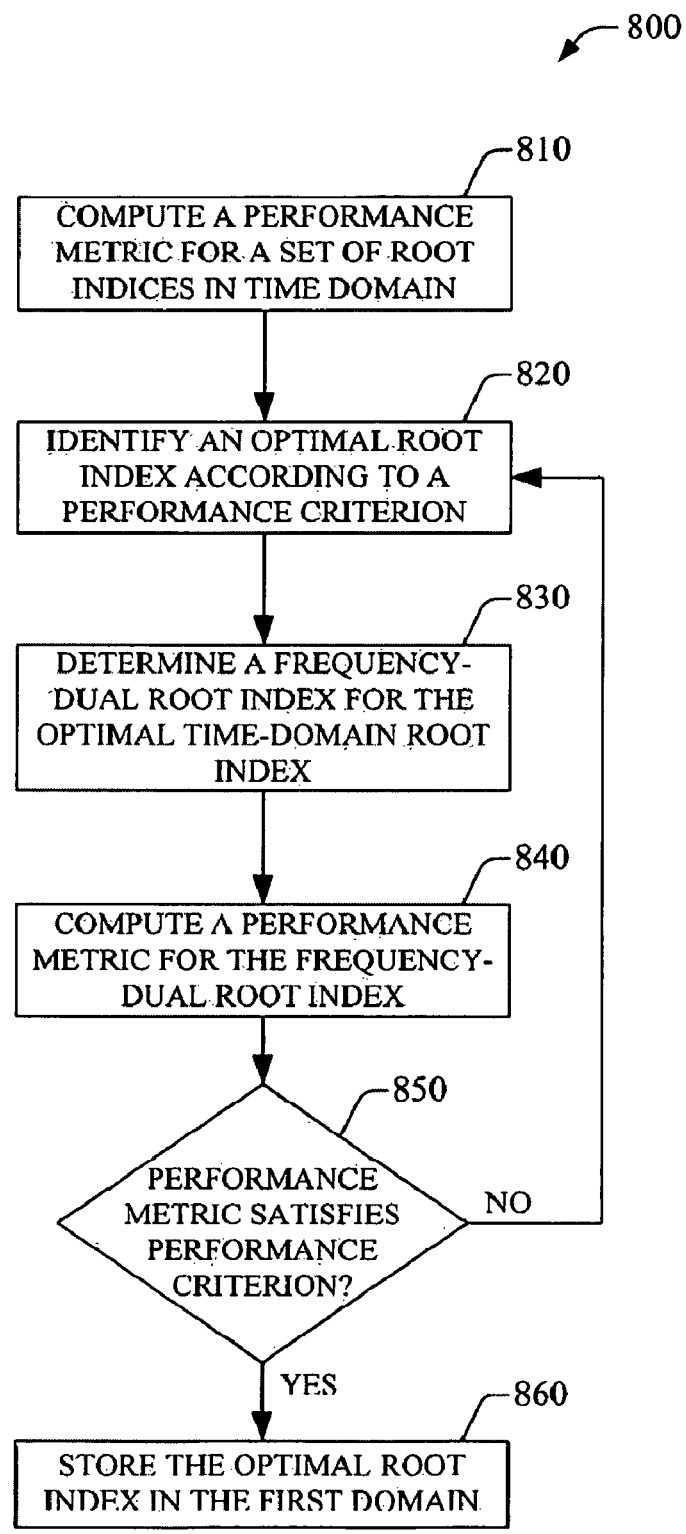
FIG. 8 presents a flowchart of an example method to select a root index, in either time domain or frequency domain, of a polyphase sequence of the CAZAC type according to aspects described herein.
Figure 9:
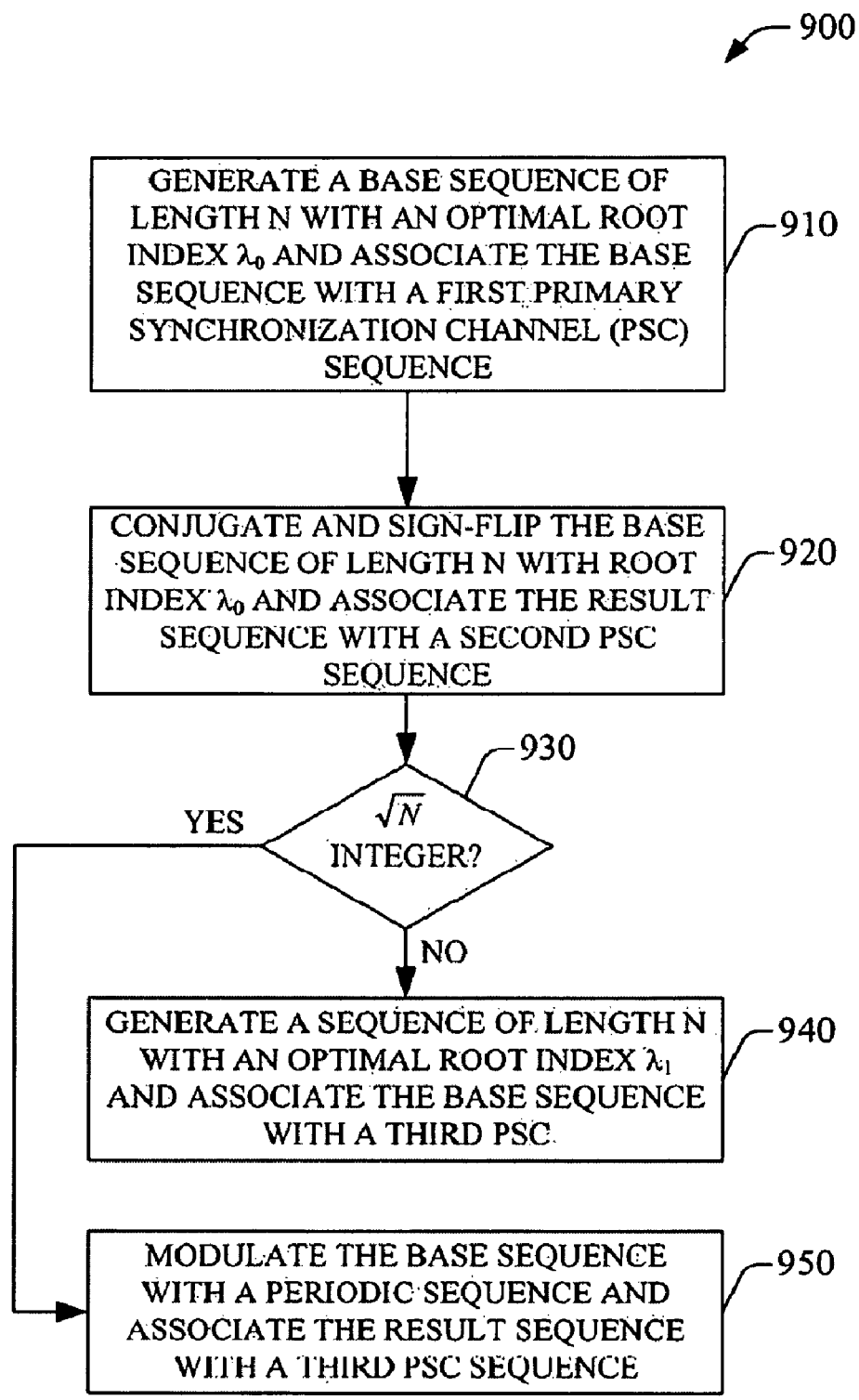
FIG. 9 is a flowchart of an example method to generate a set of three primary synchronization sequences based at least in part on a base sequence with an optimal root index, in either time-domain or frequency-domain.

In view of the example systems presented and described above, methodologies for generating a set of Zadoff-Chu primary synchronization sequences that minimize frequency offset in the presence of systematic time offsets: that may be implemented in accordance with the disclosed subject matter will be better appreciated with reference to the flowcharts of FIGS. 8 and 9. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 8 presents a flowchart of an example method 800 to select a root index, in either time domain or frequency domain, of a polyphase sequence of the CAZAC type. The methodology can be applied in a network device in a wireless environment and the resulting sequences can be utilized for synchronization in the downlink or for signaling in the uplink, e.g., through a random access channel (RACH). Such device can be a network management component, a base, station, or a mobile terminal. When the methodology is implemented for synchronization channel design, multiple sectorization (e.g., Q sectors with Q>1) of a service cell can be supported, associating a distinct sequence to each sector. At step 810, a performance metric is computed for a set of time-domain root indices. Performance metric can be dictated by a discrete cross-correlation function among a first sequence and a second sequence. In addition, the performance metric can be an estimate of a frequency offset via a synchronization simulation. At act 820, an optimal root is identified according to a performance criterion, e.g., a specific threshold for the performance metric. At act 830, a frequency-domain, or frequency dual, root index is determined for the optimal time-domain root index. Such dual root index exists since a Fourier transform of a polyphase CAZAC sequence is also a polyphase CAZAC sequence, which are defined at least in part via a root index. At act 840, a performance metric or merit factor is computed for the frequency-domain, or frequency dual, root index. At act 850 a validation is performed to determine whether the performance metric in frequency domain satisfied a performance criterion, which can be a threshold value. When the performance criterion is satisfied, the optimal index in time domain that simultaneously optimizes performance in time domain and frequency domain is stored at act 860. Conversely, a flow is directed to 820 and disparate optimal time-domain root index is identified.

It should be appreciated that example method 800 can start in frequency domain instead of time domain, since an optimal root index optimizes performance metrics in a domain and its reciprocal domain.

FIG. 9 is a flowchart of an example method 900 to generate a set of three primary synchronization sequences based at least in part on a base sequence with an optimal root index, in either time-domain or frequency-domain. While generation of three sequences is relevant to design of an optimal primary synchronization channel that ensures optimal frequency synchronization in E-UTRA, multiple sequences with optimal indices can be generated with example methodology 900. At act 910, a base sequence of length N (N a positive integer) with an optimal root index $\lambda_0$ is generated (e.g., through sequence generation component 218) and associated with a first primary synchronization code (e.g., PSC1 $320_1$). Selection of optimal root index can be effected via example method 800. At act 920, a conjugation and sign-flip operation is applied to the base sequence of length N and root index $\lambda_0$, and the result is associated with a second PSC (e.g., PSC2 $320_2$). It is to be noted that the conjugate and sign-flip operation is equivalent to generating a sequence with root index $\lambda_0$. At act 930, whether is integer is checked. In the negative case, flow is directed to act 940 and a sequence of length N with an optimal root index $\lambda_1$ is generated (e.g., through sequence generation component 218) and associated with a third PSC (e.g., PSC1 $320_3$). In the affirmative case, flow is directed to act 950 and the base sequence is modulated with a periodic sequence $B_\kappa$ of period $\kappa = \sqrt{N}$.

Figure 10:
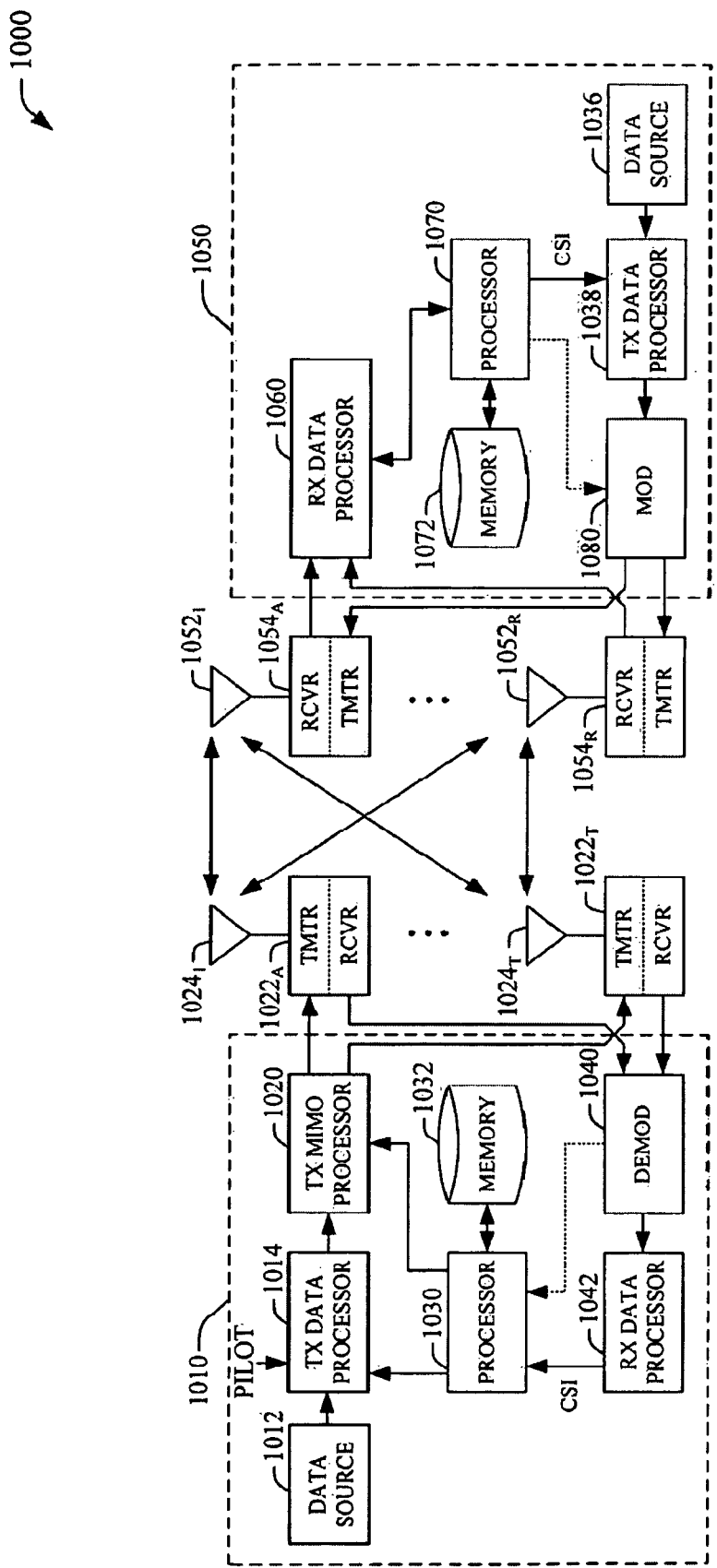
FIG. 10 is a block diagram of an embodiment of a transmitter system and a receiver system that provide for cell/sector communication in accordance with aspects described in the subject description.

FIG. 10 is a block diagram 1000 of an embodiment of a transmitter system 810 (such as node B 210, or base stations 110*a*, 110*b*, or 11.0*c*) and a receiver system 850 (e.g., access terminal 260) in a MIMO-capable system that can provide for cell/sector communication in a wireless communication environment in accordance with one or more aspects set forth herein—e.g., generation, optimization, communication and decoding of synchronization sequences (e.g., P-SCH) can occur as described hereinbefore. At the transmitter system 1010, traffic data for a number of data streams can be provided from a data source 1012 to transmit (TX) data processor 1014. In an embodiment, each data stream is transmitted over a respective transmit antenna. TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or M-ary quadrature amplitude modulation (M-QAM)) selected for that data stream to provide modulation symbols. The data rate, coding, and modulation for each data stream may be determined by instructions executed by processor 1030, the instructions as well as the data may be stored in memory 1032. In addition; processor 1030 can generate synchronization channels according to the functionalities of synchronization channel generator 215. To the accomplishment of that end, processor 1030 can rely on instructions and data structures stored in memory 1032.

The modulation symbols for all data streams are then provided to a TX MIMO processor 1020, which may further process the modulation symbols (e.g., OFDM). TX MIMO processor 1020 then provides $N_T$ modulation symbol streams to $N_T$ transceiver (TMTR/RCVR) $1022_A$ through $1022_T$. In certain embodiments, TX MIMO processor 1020 applies beamforming weights (or precoding) to the symbols of the data streams and to the antenna from which the symbol is being transmitted. Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $1022_A$ through $1022_T$ are then transmitted from $N_T$ antennas $1024_1$ through $1024_T$, respectively. At receiver system 1050, the transmitted modulated signals are received by $N_R$ antennas $1052_1$ through $1052_R$ and the received signal from each antenna 1052 is provided to a respective transceiver (RCVR/TMTR) $1054_A$ through $1054_R$. Each transceiver $1054_1$-$1054_R$ conditions (e.g., filters, amplifies, and downconverts) a respective received signal, digitizes the conditioned signal to provide samples, and further processes the samples to provide a corresponding "received" symbol stream.

An RX data processor 1060 then receives and processes the $N_R$ received symbol streams from $N_R$ transceivers $1054_1$-$1054_R$ based on a particular receiver processing technique to provide $N_T$ "detected" symbol streams. The RX data processor 1060 then demodulates, deinterleaves, and decodes each detected symbol stream to recover the traffic data for the data stream. The processing by RX data processor 1060 is complementary to that performed by TX MIMO processor 1020 and TX data processor 1014 at transmitter system 1010. A processor 1070 periodically determines which pre-coding matrix to use, such a matrix can be stored in memory 1072. Processor 1070 formulates a reverse link message comprising a matrix index portion and a rank value portion. Memory 1072 may store instructions that when executed by processor 1070 result in formulating the reverse link message. The reverse link message may comprise various types of information regarding the communication link or the received data stream, or a combination thereof. As ah example, such information can comprise an adjusted communication resource, an offset for adjusting a scheduled resource, and information for decoding a data packet format. The reverse link message is then processed by a TX data processor 1038, which also receives traffic data for a number of data streams from a data source 1036, modulated by a modulator 1080, conditioned by transceiver $1054_A$ through $1054_R$, and transmitted back to transmitter system 1010. In addition, processor 1070 can process received synchronization channels according, at least in part, to the functionalities associated with synchronization channel processing component. To the accomplishment of the latter, processor 1070 can rely on code instruction and algorithms stored in memory 1072.

At transmitter system 1010, the modulated signals from receiver system 1050 are received by antennas $1024_1$-$1024_T$, conditioned by transceivers $1022_A$-$1022_T$, demodulated by a demodulator 1040, and processed by a RX data processor 1042 to extract the reserve link message transmitted by the receiver system 1050. Processor 1030 then determines which pre-coding matrix to use for determining the beamforming weights and processes the extracted message.

Single-user (SU) MIMO mode of operation corresponds to the case in which a single receiver system 1050 communicates with transmitter system 1010, as illustrated in FIG. 10 and according to the operation described above. It should be appreciated that in the subject mode of operation inter-cell power can be effected as described hereinbefore. In a SU- MIMO system, the $N_T$ transmitters $1024_1$-$824_T$ (also known as TX antennas) and $N_R$ receivers $1052_1$-$1052_R$ (also known as RX antennas) form a matrix channel (e.g., Rayleigh channel, or Gaussian channel) for wireless communication. The SU-MIMO channel is generally described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to $\min\{N_T, N_R\}$. A MIMO channel formed by the $N_T$ transmit and $N_R$ receive antennas may be decomposed into $N_v$ independent channels, which are also referred to as spatial channels, where $N_v \leq \min\{N_T, NR\}$. Each of the $N_v$ independent channels corresponds to a dimension or communication layer. Synchronization channel generator 215 can map a generated sequence, after modulation thereof, into the $N_v$ communication layers in which the MIMO channel can be decomposed. Processor 225 can perform a portion of the mapping.

In one aspect, transmitted/received symbols with OFDM, at tone $\omega$, can be modeled by:

$$y(\omega) = \underline{H}(\omega)c(\omega) + n(\omega). \qquad (3)$$

Here, $y(\omega)$ is the received data stream and is a $N_R \times 1$ vector, $H(\omega)$ is the channel response $N_R \times N_T$ matrix at tone $\omega$ (e.g., the Fourier transform of the time-dependent channel response matrix h), $c(\omega)$ is an $N_T \times 1$ output symbol vector, and $n(\omega)$ is an $N_R \times 1$ noise vector (e.g., additive white Gaussian noise). Precoding Can convert a $N_v \times 1$ layer vector to $N_T \times 1$ precoding output vector. $N_v$ is the actual number of data streams (layers) transmitted by transmitter 1010, and $N_v$ can be scheduled at the discretion of the transmitter (e.g., access point 250) based at least in part on channel conditions and the rank reported by the terminal. It should be appreciated that $c(\omega)$ is the result of at least one multiplexing scheme, and at least one pre-coding (or beamforming) scheme applied by the transmitter. Additionally, $c(\omega)$ is convoluted with a power gain matrix, which determines the amount of power transmitter 1010 allocates to transmit each data stream $N_v$. It should be appreciated that such a power gain matrix can be a resource that is assigned to access terminal 240, and it can be managed through adjustment of power offsets as described herein. In view of the forward link/reverse link reciprocity of a wireless channel, it should be appreciated that a transmission from MIMO receiver 1050 can also be modeled in the fashion of Eq. (3), including substantially the same elements. In addition, receiver 1050 can also apply pre-coding schemes prior to transmitting data in the reverse link. It should be appreciated that generation of optimized PSCs (e.g., $320_1$, $320_2$, or $320_3$) precedes mapping of the generated sequence into an OFDM time-frequency resource block. As mentioned above, synchronization channel generator 215 can map a generated sequence, which can be conveyed in the manner described above.

In system 1000 (FIG. 10), when $N_T = N_R = 1$, the system reduces to a single-input single-output (SISO) system that can provide for sector communication in a wireless communication environment in accordance with one or more aspects set forth herein. Alternatively, a single-input multiple output (SIMO) mode of operation corresponds to $N_T > 1$ and $N_R = 1$. Furthermore, when multiple receivers communicate with transmitter system 1010, a multiuser (MU) MIMO mode of operation is established.

Next, a system that can enable aspects of the disclosed subject matter are described in connection with FIG. 11. Such system can include functional blocks, which can be functional blocks that represent functions implemented by a processor or an electronic machine, software, or combination thereof (e.g., firmware).

Figure 11:
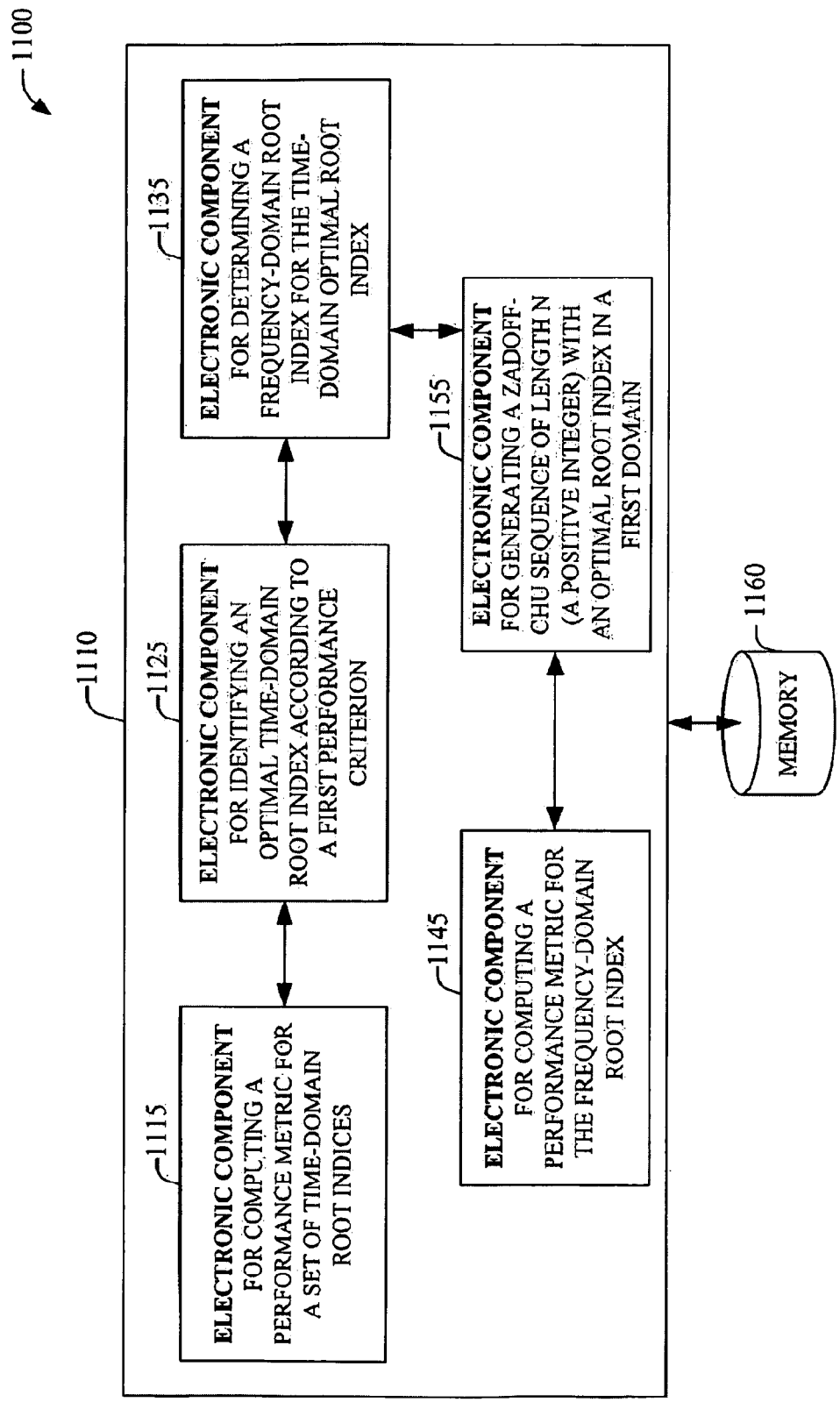
FIG. 11 illustrates a block diagram of an example system that enables designing a primary synchronization channel in accordance with aspects of the subject specification.

FIG. 11 illustrates a block diagram of an example system 1100 that enables designing a primary synchronization channel in accordance with aspects of the subject specification. In an aspect, designing the primary synchronization comprises generating, optimizing and conveying a set of primary synchronization sequences as described herein. System 1100 can reside, at least partially, within a wireless base station (e.g., Node B 210). System 1100 includes a logical grouping 1110 of electronic components that can act in conjunction. In an aspect, logical grouping 1010 includes an electronic component 1015 for computing a performance metric for a set of time-domain root indices; an electronic component 1025 for identifying an optimal time-domain root index according to a first performance criterion; an electronic component 1035 for determining a frequency-domain root index for the time-domain optimal root index; an electronic component 1045 for computing a performance metric for the frequency-domain root index; and an electronic component 1055 for generating a Zadoff-Chu sequence of length N (a positive integer) with an optimal root index in a first domain.

System 1100 can also include a memory 1160 that retains instructions for executing functions associated with electronic components 1115, 1125, 1135, 1145, and 1155, as well as measured and computed data that may be generated during executing such functions. While shown as being external to memory 1160, it is to be understood that one or more of electronic components 1115, 1125, 1135, 1145 and 1155 can exist within memory 1160.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture is intended to comprise, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on quoits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores; algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise; without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes," "including," "posses," "possessing," or variants thereof are used in either the detailed description or the claims, such terms are intended to be inclusive in a manner similar to the term "comprising" as "comprising" is interpreted when employed as a transitional word in a claim.

What is claimed is:

1. A method, comprising:
identifying, by an apparatus, an optimal root index in a first domain according to a first performance criterion;
determining, by the apparatus, a domain-dual root index for the optimal root index in the first domain and computing a performance metric for the domain-dual root index; and
when the domain-dual root index satisfies a second performance criterion, storing, by the apparatus, the optimal root index;
wherein said step of identifying an optimal root index in a first domain further comprises computing a performance metric for a set of indices in the first domain and wherein the performance metric is $$\sum_{k=-N/2}^{1} (kl_\lambda(k))^{-2} + \sum_{k=1}^{N/2-1} (kl_\lambda(k))^{-2},$$

where $$l_\lambda(k) = -\lambda k (\mathrm{mod} N) - N/2.$$

2. The method of claim 1, further comprising:
generating a base sequence of length N (a positive integer) with an optimal root index in a first domain; and
associating the base sequence with a first primary synchronization channel (PSC) sequence.

3. The method of claim 2, further comprising conjugating and sign-flipping the base sequence and associating the result with a second PSC sequence.

4. The method of claim 3, wherein when $\kappa=\sqrt{N}$ is an integer, modulating the base sequence with a x-periodic sequence and associating the result with a third PSC sequence.

5. The method of claim 3, wherein the base sequence is a Zadoff-Chu sequence.

6. The method of claim 1, wherein the performance metric is an apparent frequency offset.

7. The method of claim 1, wherein the first domain is at least one of a time domain or a frequency domain.

8. The method of claim 6, wherein the dual-domain is one of a frequency domain or a time domain.

9. An apparatus that operates in a wireless communication system, comprising:
a processor configured to compute a performance metric for a set of time-domain root indices; to select an optimal time-domain root index according to a first performance criterion; to determine a frequency-domain root index for the time-domain optimal root index; to compute a performance metric for the frequency-domain root index;
a memory coupled to the processor, wherein the processor is further configured to retain the optimal root index when the frequency-domain root index satisfies a second performance criterion, to generate a Zadoff-Chu base sequence of length N (a positive integer) with the optimal time-domain root index, to associate the Zadoff-Chu base sequence with a first primary synchronization channel (PSC) sequence, to conjugate and sign-flip the Zadoff-Chu base sequence and associate the result with a second PSC sequence, and to modulate the Zadoff-Chu base sequence with a sequence of period $\kappa=\sqrt{N}$, when x is an integer; and to associate the result with a third PSC sequence
wherein the performance metric is $$\sum_{k=-N/2}^{1} (kl_\lambda(k))^{-2} + \sum_{k=1}^{N/2-1} (kl_\lambda(k))^{-2}, \text{ where}$$

$$l_\lambda(k) = -\lambda k (\mathrm{mod} N) - N/2.$$

10. The apparatus of claim 9, wherein the processor is further configured to identify a disparate time-domain root index according to the first performance criterion when the frequency-domain root index fails to satisfy a second performance criterion.

11. An apparatus, comprising:
means for identifying an optimal root index in a first domain according to a first performance criterion;

means for determining a domain-dual root index for the optimal root index in the first domain and computing a performance metric for the domain-dual root index; and when the domain-dual root index satisfies a second performance criterion, means for storing the optimal root index;

wherein said means for identifying an optimal root index in a first domain further comprises means for computing a performance metric for a set of indices in the first domain and wherein the performance metric is $$\sum_{k=-N/2}^{1}(kl_\lambda(k))^{-2} + \sum_{k=1}^{N/2-1}(kl_\lambda(k))^{-2}, \text{ where}$$

$$l_\lambda(k) = -\lambda k (\text{mod} N) - N/2.$$

12. The apparatus of claim 11, wherein the performance metric is an apparent frequency offset.

13. The method of claim 12, wherein the dual-domain is one of a frequency domain or a time domain.

14. The apparatus of claim 11, wherein the first domain is at least one of a time domain or a frequency domain.

15. A computer program product including a non-transitory computer-readable medium comprising:

code for causing a computer to identify an optimal root index in a first domain according to a first performance criterion;

code for causing a computer to determine a domain-dual root index for the optimal root index in the first domain and computing a performance metric for the domain-dual root index; and code for causing a computer to store the optimal root index when the domain-dual root index satisfies a second performance criterion;

wherein said code for causing a computer to identify an optimal root index in a first domain further comprises code for causing a computer to compute a performance metric for a set of indices in the first domain and wherein the performance metric is $$\sum_{k=-N/2}^{1}(kl_\lambda(k))^{-2} + \sum_{k=1}^{N/2-1}(kl_\lambda(k))^{-2}, \text{ where}$$

$$l_\lambda(k) = -\lambda k (\text{mod} N) - N/2.$$

16. The computer program product of claim 15, wherein the performance metric is an apparent frequency offset.

17. The computer program product of claim 16, wherein the dual-domain is one of a frequency domain or a time domain.

18. The computer program product of claim 15, wherein the first domain is at least one of a time domain or a frequency domain.

* * * * *